(12) United States Patent
Wang et al.

(10) Patent No.: US 11,157,568 B2
(45) Date of Patent: Oct. 26, 2021

(54) OFFLINE MODE FOR MOBILE APPLICATION

(71) Applicant: SAP SE, Walldorf (DE)

(72) Inventors: Nathan Wang, Port Coquitlam (CA); Walter Mak, North Vancouver (CA); Pak Man Chan, Vancouver (CA); Tsz Hong Sung, Richmond (CA)

(73) Assignee: SAP SE, Walldorf (DE)

( * ) Notice: Subject to any disclaimer, the term of this patent is extended or adjusted under 35 U.S.C. 154(b) by 567 days.

(21) Appl. No.: 15/801,276

(22) Filed: Nov. 1, 2017

(65) Prior Publication Data

US 2019/0130051 A1    May 2, 2019

(51) Int. Cl.
*G06F 16/904* (2019.01)
*G06F 16/951* (2019.01)
*G06F 16/957* (2019.01)

(52) U.S. Cl.
CPC .......... *G06F 16/904* (2019.01); *G06F 16/951* (2019.01); *G06F 16/9574* (2019.01)

(58) Field of Classification Search
CPC ... G06F 16/904; G06F 16/9574; G06F 16/951
USPC .................................................. 707/722, 736
See application file for complete search history.

(56) References Cited

U.S. PATENT DOCUMENTS

| | | | |
|---|---|---|---|
| 9,075,583 B1* | 7/2015 | Cutter | G06F 8/20 |
| 9,917,923 B2* | 3/2018 | Javed | H04W 4/18 |
| 9,923,988 B2* | 3/2018 | Chen | A63F 13/35 |
| 2002/0078136 A1* | 6/2002 | Brodsky | G06F 16/9574 |
| | | | 709/203 |
| 2002/0078255 A1* | 6/2002 | Narayan | H04L 67/10 |
| | | | 719/316 |
| 2010/0080411 A1* | 4/2010 | Deliyannis | G06F 16/951 |
| | | | 382/100 |
| 2012/0226970 A1* | 9/2012 | Porter | G06F 40/143 |
| | | | 715/234 |
| 2013/0066926 A1* | 3/2013 | Cragun | G06F 16/93 |
| | | | 707/810 |
| 2013/0227362 A1* | 8/2013 | Moshayedi | G06F 11/1068 |
| | | | 714/710 |
| 2014/0297735 A1* | 10/2014 | Aoyagi | H04L 67/108 |
| | | | 709/203 |
| 2015/0019677 A1* | 1/2015 | Chen | H04L 67/2842 |
| | | | 709/213 |
| 2015/0213134 A1* | 7/2015 | Nie | G06F 16/951 |
| | | | 707/770 |

(Continued)

*Primary Examiner* — Phong H Nguyen
(74) *Attorney, Agent, or Firm* — Fountainhead Law Group P.C.

(57) ABSTRACT

Some embodiments provide a non-transitory machine-readable medium that stores a program. The program receives a first request for a visualization of data. In response to the first request, the program further retrieves the data from a storage of a computing system. The program also generates the visualization based on the data from the storage of the computing system. The program further stores the data in a storage of the device. The program also receives a second request for the visualization of the data. The program further determines that the device is unable to communicate with the computing system. In response to the determination, the program also retrieves the data from the storage of the device. The program further generates the visualization based on the data retrieved from the storage of the device.

18 Claims, 11 Drawing Sheets

(56) References Cited

U.S. PATENT DOCUMENTS

| | | | |
|---|---|---|---|
| 2015/0373116 A1* | 12/2015 | Mo | G06F 3/0647 |
| | | | 709/219 |
| 2016/0094497 A1* | 3/2016 | Javed | G06F 16/95 |
| | | | 709/206 |
| 2016/0349967 A1* | 12/2016 | Ericsson | G06F 3/04842 |
| 2016/0359880 A1* | 12/2016 | Pang | H04L 63/145 |
| 2018/0165013 A1* | 6/2018 | Biesemann | G06F 3/0673 |
| 2018/0218050 A1* | 8/2018 | Porath | G06F 16/2477 |
| 2019/0080535 A1* | 3/2019 | Berg | G07C 9/29 |

* cited by examiner

OFFLINE MODE FOR MOBILE APPLICATION

BACKGROUND

For cloud computing environments, applications, resources, data, etc. may be hosted on one or more computing devices and are accessible via networks (e.g., the Internet). Typically, a client device (e.g., a desktop computer, a laptop, a mobile device, etc.) can access the applications, resources, data, etc. hosted on the cloud computing environment through a web browser operating on the client device. In some instances, a mobile application may be developed for mobile devices so that mobile devices can access the applications, resources, data, etc. hosted on the cloud computing system.

SUMMARY

In some embodiments, a non-transitory machine-readable medium stores a program. The program receives a first request for a visualization of data. In response to the first request, the program further retrieves the data from a storage of a computing system. The program also generates the visualization based on the data from the storage of the computing system. The program further stores the data in a storage of the device. The program also receives a second request for the visualization of the data. The program further determines that the device is unable to communicate with the computing system. In response to the determination, the program also retrieves the data from the storage of the device. The program further generates the visualization based on the data retrieved from the storage of the device.

In some embodiments, the data retrieved from the storage of the computing system may include data from a data model. In response to the first request, the program may further retrieve static data from the storage of the computing system. Generating the visualization based on the data from the storage of the computing system may be further based on the static data from the storage of the computing system. The program may also store the static data in the storage of the device. In response to the determination, the program may further retrieve the static data from the storage of the device. Generating the visualization based on the data retrieved from the storage of the device may be further based on the static data retrieved from the storage of the device.

In some embodiments, for a device, a method receives a first request for a visualization of data. In response to the first request, the method further retrieves the data from a storage of a computing system. The method also generates the visualization based on the data from the storage of the computing system. The method further stores the data in a storage of the device. The method also receives a second request for the visualization of the data. The method further determines that the device is unable to communicate with the computing system. In response to the determination, the method also retrieves the data from the storage of the device. The method further generates the visualization based on the data retrieved from the storage of the device.

In some embodiments, the data retrieved from the storage of the computing system may include data from a data model. In response to the first request, the method may further retrieve static data from the storage of the computing system. Generating the visualization based on the data from the storage of the computing system may be further based on the static data from the storage of the computing system. The method may also store the static data in the storage of the device. In response to the determination, the method may further retrieve the static data from the storage of the device. Generating the visualization based on the data retrieved from the storage of the device may be further based on the static data retrieved from the storage of the device.

In some embodiments, a system includes a set of processing units and a non-transitory computer-readable medium that stores instructions. The instructions cause at least one processing unit to receive a first request for a visualization of data. In response to the first request, the instructions further cause the at least one processing unit to retrieve the data from a storage of a computing system. The instructions also cause the at least one processing unit to generate the visualization based on the data from the storage of the computing system. The instructions further cause the at least one processing unit to store the data in a storage of the system. The instructions also cause the at least one processing unit to receive a second request for the visualization of the data. The instructions further cause the at least one processing unit to determine that the system is unable to communicate with the computing system. In response to the determination, the instructions also cause the at least one processing unit to retrieve the data from the storage of the system. The instructions further cause the at least one processing unit to generate the visualization based on the data retrieved from the storage of the system.

In some embodiments, the data retrieved from the storage of the computing system may include data from a data model. The instructions may further cause the at least one processing unit to, in response to the first request, retrieve static data from the storage of the computing system. Generating the visualization based on the data from the storage of the computing system may be further based on the static data from the storage of the computing system. The instructions may also cause the at least one processing unit to store the static data in the storage of the device. In response to the determination, the instructions may further cause the at least one processing unit to retrieve the static data from the storage of the device. Generating the visualization based on the data retrieved from the storage of the device may be further based on the static data retrieved from the storage of the device.

The following detailed description and accompanying drawings provide a better understanding of the nature and advantages of the present invention.

DETAILED DESCRIPTION

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Described herein are techniques for providing an offline mode for an application operating on a mobile device that uses data stored in a computing system. In some embodiments, when the application can communicate with the computing system, the application requests/receives data from the computing system. For example, the application may receive a request from a user of the application to view a visualization of data. In response to the request, the application may request the data for the visualization from the computing system. Once the application receives the data, the application generates the visualization and presents it for viewing. When the application cannot communicate with the computing system, the application can operate in an offline mode. In this offline mode, the application allows a user to interact with data that the application has previously requested from the computing system. Thus, the application can still present the visualization of data to the user even if the application cannot communicate with the computing system.

In some embodiments, a data model specifies relationships and/or structures of elements of data. A data model may be defined as one or more views and one or more tables associated with the one or more views. A view can be a filter associated with one or more tables that provides access to one or more attributes (e.g., columns) of the one or more tables. Alternatively or in addition, a view may provide access to data calculated based on and/or derived from one or more attributes of the one or more tables. In some instances, a view can be a filter associated with one or more views and/or tables that provides access to one or more attributes of the one or more views and/or tables. In some embodiments, a data model definition specifies one or more tables that includes a set of measures and a set of dimensions. In some such embodiments, a measure may be an attribute in the one or more tables that is configured to store a numeric value while a dimension may be an attribute in the one or more tables that is configured to store a value associated with a measure that is used for categorizing the measure.

Figure 1:
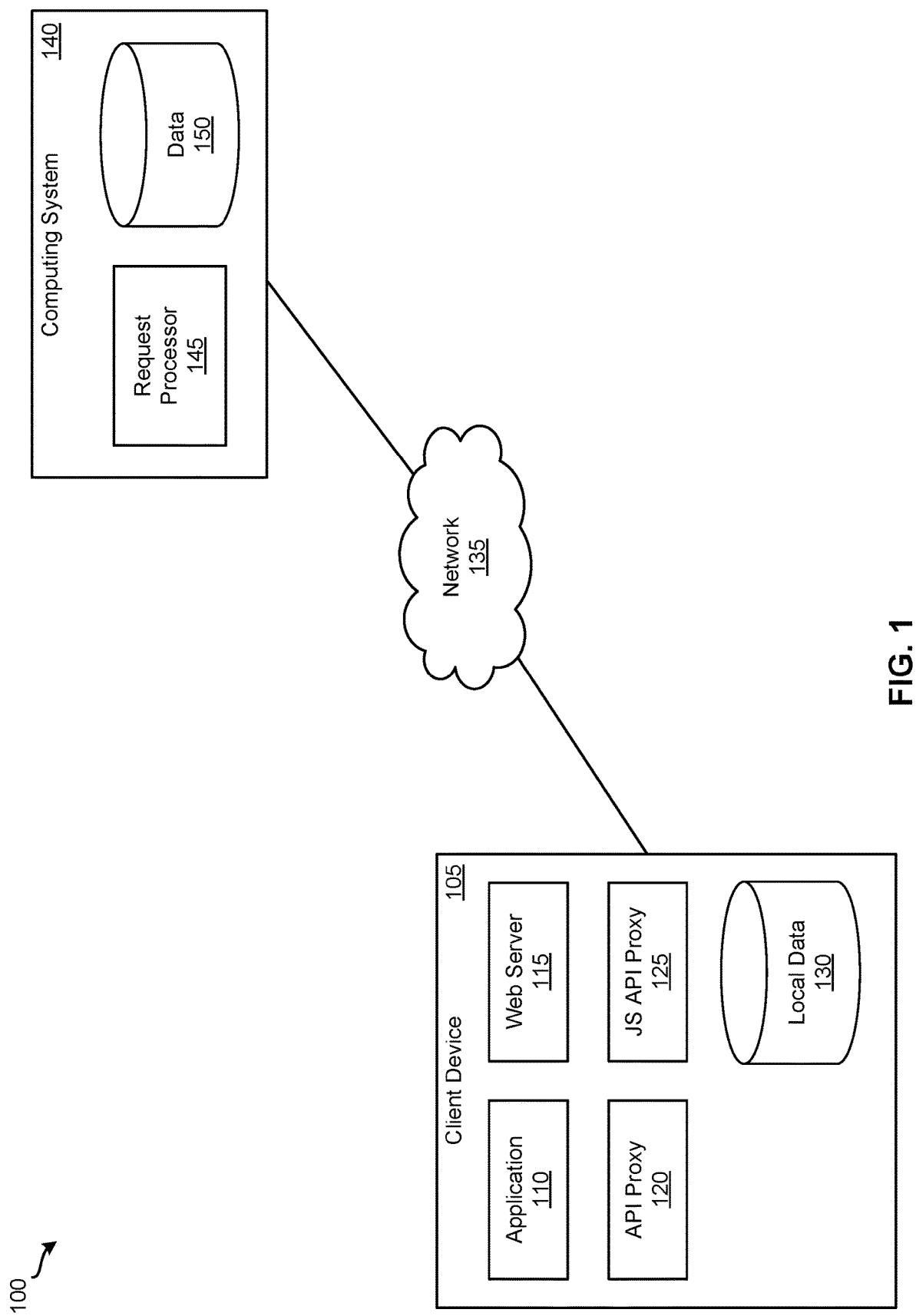
FIG. 1 illustrates a system according to some embodiments.

FIG. 1 illustrates a system 100 according to some embodiments. As shown, system 100 includes client devices 105, network 135, and computing system 140. Network 135 may be any type of network configured to facilitate data communications among client device 105 and computing system 140 using any of a variety of network protocols. Network 135 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

As shown, client device 105 includes application 110, web server 115, application programming interface (API) proxy 120, Javascipt (JS) API proxy 125, and local data storage 130. Local data storage 130 is configured to store data used by application 110, web server 115, API proxy 120, and JS API proxy 125. In some embodiments, storage 130 is implemented in a single physical storage while, in other embodiments, storage 130 may be implemented across several physical storages. While FIG. 1 shows storage 130 as part of client device 105, one of ordinary skill in the art will appreciate that storage 130 may be external to client device 105 in some embodiments.

Application 110 may be a software application operating on client device 105. Application 110 may be any number of different types of applications. For instance, application 110 may be an analytics application, a data management application, a human capital management application, an enterprise management application, a customer relationship management application, a financial management application, etc. Application 110 may receive requests from client device 105. For instance, application 110 can receive from client device 105 a request to generate a visualization of data stored according to a data model. In response to the request, application 110 may send web server 115 a request for static data associated with the visualization. Examples of static data include hypertext markup language (HTML) pages, cascading style sheets (CSS), images, geographic maps (geomaps), etc. In some embodiments, application 110 sends the request to web server 115 using a hypertext transfer protocol (HTTP) communication protocol. In response to the request received from client device 105 to generate the visualization of data, application 110 may also send API proxy 120 a request for a visualization definition of the visualization. In some embodiments, a visualization definition includes a title associated with the visualization, units of the values of data in the visualization, a chart type (e.g., a pie chart, a bar chart, a scatter chart, a line chart, etc.) associated with the visualization, colors of elements in the visualization, dimension values of dimensions associated with the visualization, a set of queries for data in a data model that is used for the visualization, etc. In addition, application 110 can send JS API proxy 125 the set of queries included in the definition of the visualization in order to request for data in a data model (e.g., data stored according to the data model) that is used for the visualization. Based on the data received from web server 115, API proxy 120, and JS API proxy 125, application 110 can generate the visualization of data and present (e.g., by displaying on a display of client device 105) it to the user of client device 105.

Figure 2:
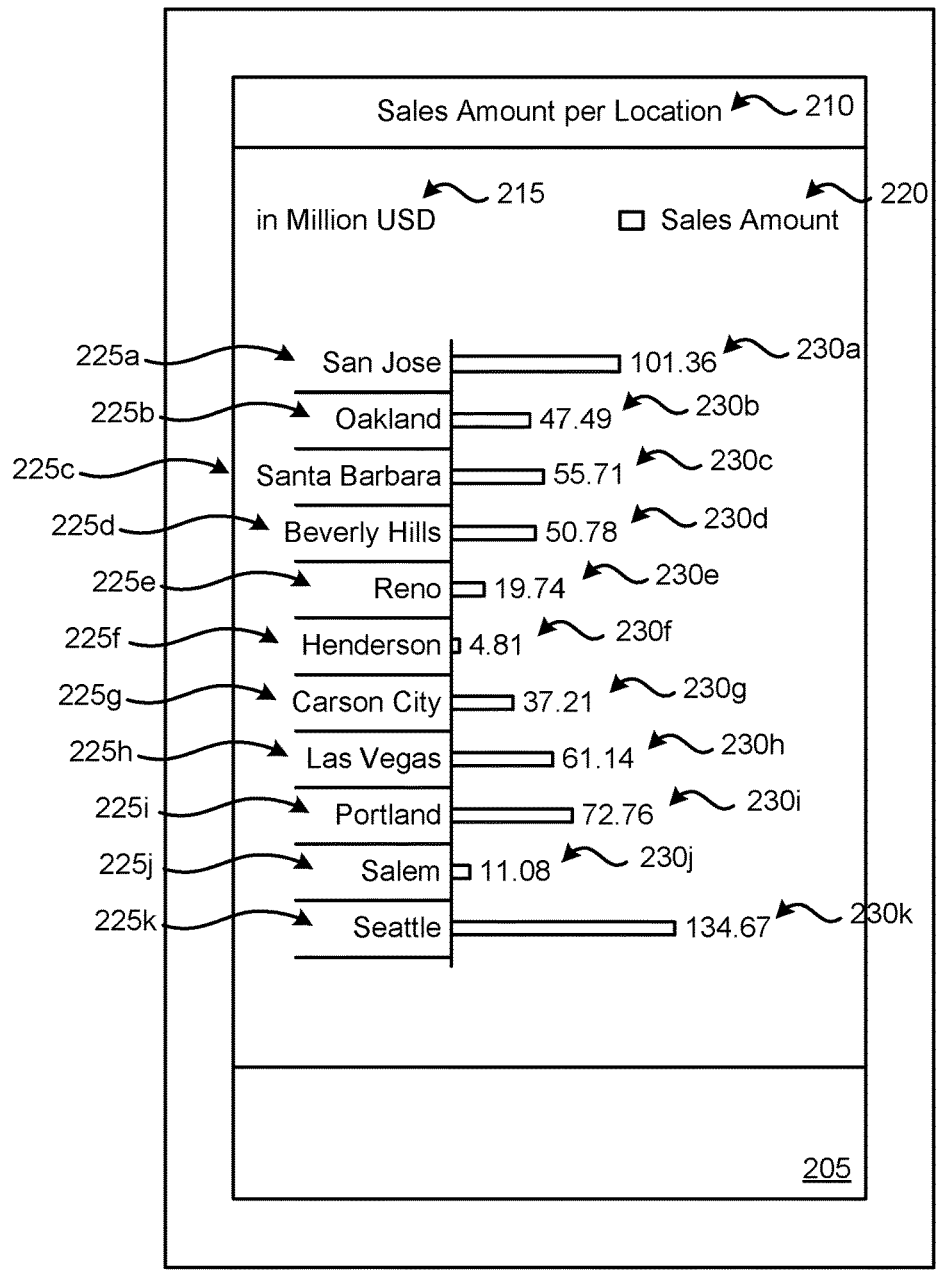
FIG. 2 illustrates an example page that includes a visualization according to some embodiments.

FIG. 2 illustrates an example page 200 that includes a visualization according to some embodiments. In this example, page 200 is implemented as an HTML page that application 110 requests from web server 115. As shown, page 200 has a particular layout that includes visualization 205. For this example, the layout and formatting of page 200 is specified in a CSS file that application 110 requests from web server 115. As such, the HTML page and CSS file in this example are static data that application 110 requests from web server 115. One of ordinary skill in the art will appreciate that page 200 may include any number of additional and/or different static elements that application 110 may request from web server 115 in some embodiments.

As shown in FIG. 2, visualization 205 includes title 210, units 215, measure label 220, dimension values 225a-k, and measure values 230a-k. As mentioned above, application 110 may also send API proxy 120 a request for a visualization definition of a visualization in response to a receiving a request from application 110 to generate the visualization. In this example, the definition of visualization 205 includes title 210, units 215, measure labels 220*a-k*, a chart type, a set of queries for data in a data model that is used for the visualization. Specifically, title 210 is "Sales Amount per Location", units 215 is millions in United States Dollars (USD), measure labels 220*a-k* are dimension values San Jose, Oakland, Santa Barbara, Beverly Hills, Reno, Henderson, Carson City, Las Vegas, Portland, Salem, and Seattle of a location dimension, and the chart type is a bar chart. In addition, application 110 may send JS API proxy 125 the set of queries included in the definition of the visualization in order to request for data in the data model that is used for the visualization in response to receiving a request from application 110 to generate the visualization. For this example, the data in the data model includes measure values 230*a-k* that are associated with dimension values 225*a-k*, respectively (i.e., 101.36 for San Jose, 47.49 for Oakland, 55.71 for Santa Barbara, 50.78 for Beverly Hills, 19.74 for Reno, 4.81 for Henderson, 37.21 for Carson City, 61.14 for Las Vegas, 72.76 for Portland, 11.08 for Salem, and 134.67 for Seattle). Based on the data received from web server 115, API proxy 120, and JS API proxy 125, application 110 can generate the visualization of data and present (e.g., by displaying on a display of client device 105) it to the user of client device 105. Based on the data received from web server 115, API proxy 120, and JS API proxy 125, application 110 may generate visualization 205 and page 200, as shown in FIG. 2, in response to receiving a request from a user of application 110 to generate visualization 205.

Returning to FIG. 1, web server 115 is configured to handle requests for static data from application 110. For instance, when web server 115 receives (e.g., via an HTTP communication protocol) a request from application 110 for static data associated with a visualization of data, web server 115 determines whether it can communicate with computing system 140. For example, web server 115 determines that it cannot communicate with computing system 140 if a cellular component of client device 105 does not have a signal, a network component of client device 105 is not connected to a network, computing system 140 is unresponsive, etc. If web server 115 determines that it can communicate with computing system 140, web server 115 forwards the request to computing system 140 via network 135. Once computing system 140 processes the request, web server 115 receives the data from computing system 140, stores it in local data storage 130, and forwards it to application 110. If web server 115 determines that it cannot communicate with computing system 140, web server 115 checks whether the data is stored in local data storage 130. If the data is stored in local data storage 130, web server 115 retrieves it and sends it to application 110.

In some embodiments, web server 115 handles the deletion of data stored in local data storage 130. For example, web server 115 may delete a particular set of data from local data storage 130 once the particular set of data has been stored in local data storage 130 for more than a defined amount of time (e.g., two days, five days, one week, etc.). When the amount of free space in local data storage 130 falls below a defined amount (e.g., 100 megabytes (MBs), 500 MBs, 1 gigabyte (GB), etc.) or a defined portion (e.g., 5%, 10%, 15%) of the overall capacity of local data storage 130, web server 115 may delete data from local data storage 130 (e.g., the oldest data, the largest data, etc.) until the amount of free space in local data storage 130 no longer falls below the defined amount or the defined portion of the overall capacity of local data storage 130. In some embodiments, web server 115 does not include particular web server features such as, for example, cache-control, HTTP secure (HTTPS), keep-alive, etc. In some such embodiments, such a web server is referred to as a lite web server.

API proxy 120 processes requests from application 110 for visualization definitions. As described above, a visualization definition of a visualization may include a title associated with the visualization, units of the values of data in the visualization, a chart type (e.g., a pie chart, a bar chart, a scatter chart, a line chart, etc.) associated with the visualization, colors of elements in the visualization, dimension values of dimensions associated with the visualization, a set of queries for data in a data model that is used for the visualization, etc. In some embodiments, API proxy 120 receives these requests through a set of APIs that API proxy 120 provides to application 110. As an example, API proxy 120 can receive (e.g., through an API call) a request from application 110 for a visualization definition. In response to such a request, API proxy 120 determines whether it can communicate with computing system 140. For instance, API proxy 120 determines that it cannot communicate with computing system 140 if a cellular component of client device 105 does not have a signal, a network component of client device 105 is not connected to a network, computing system 140 is unresponsive, etc. When API proxy 120 determines that it can communicate with computing system 140, API proxy 120 forwards the request to computing system 140 via network 135. Once computing system 140 processes the request, API proxy 120 receives the visualization definition from computing system 140, stores it in local data storage 130, and forwards it to application 110. When API proxy 120 determines that it cannot communicate with computing system 140, API proxy 120 checks whether the visualization definition is stored in local data storage 130. If the visualization definition is stored in local data storage 130, API proxy 120 retrieves it and sends it to application 110. Otherwise, API proxy 120 notifies application 110 that the data is not available. In some embodiments, API proxy 120 deletes data from local data storage 130 in the same or similar manner as that described above by reference to web server 115.

JS API proxy 125 is configured to process requests from application 110. In some embodiments, JS API proxy 125 receives these requests through a set of APIs that JS API proxy 125 provides to application 110. For instance, JS API proxy 125 may receive (e.g., through an API call) from application 110 a set of queries that requests for data in a data model (e.g., data stored according to the data model that is used for a visualization). In response to receiving the set of queries, JS API proxy 125 determines whether it can communicate with computing system 140. For example, JS API proxy 125 determines that it cannot communicate with computing system 140 if a cellular component of client device 105 does not have a signal, a network component of client device 105 is not connected to a network, computing system 140 is unresponsive, etc. If JS API proxy 125 determines that it can communicate with computing system 140, JS API proxy 125 forwards the set of queries to computing system 140 via network 135. Once computing system 140 processes the set of queries, JS API proxy 125 receives the data requested from the set of queries from computing system 140, stores it in local data storage 130, and forwards it to application 110. If JS API proxy 125 determines that it cannot communicate with computing system 140, JS API proxy 125 queries local data storage 130 according on the set of queries. If the data is stored in local data storage 130, JS API proxy 125 retrieves it and sends it to application 110. Otherwise, JS API proxy 125 notifies application 110 that the data is not available. In some embodiments, JS API proxy 125 deletes data from local data storage 130 in the same or similar manner as that described above by reference to web server 115.

As illustrated in FIG. 1, computing system 140 includes request processor 145 and data storage 150. Data storage 150 is configured to store data organized according to data models. In some embodiments, storage 150 is implemented in a single physical storage while, in other embodiments, storage 150 may be implemented across several physical storages. While FIG. 1 shows storage 150 as part of computing system 140, one of ordinary skill in the art will appreciate that storage 150 may be external to computing system 140 in some embodiments.

Request processor 145 is responsible for handling requests from client device 105. For instance, request processor 145 may receive from client device 105 a request for static data associated with a visualization of data. In response to such a request, request processor 145 accesses data storage 150, retrieves the requested data, and sends it back to client device 105. As another example, request processor 145 can receive from client device 105 a set of queries for data in a data model. In response to receiving the set of queries, request processor 145 queries data storage 150 according to the set of queries, retrieves the requested data, and sends it back to client device 105.

Figure 3A:
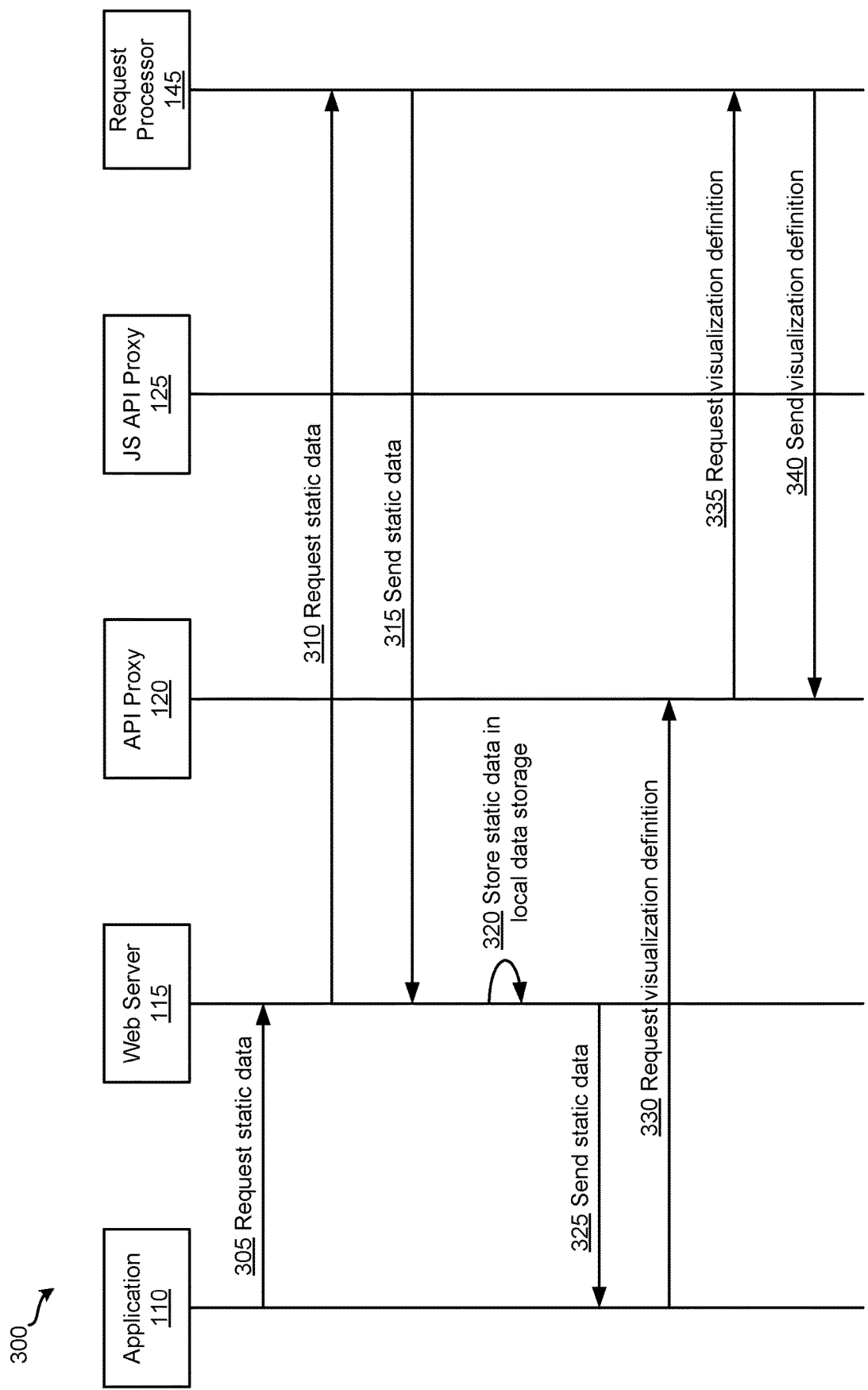
FIGS. 3A and 3B illustrate an example data flow through the system illustrated in FIG. 1 according to some embodiments.
Figure 3B:
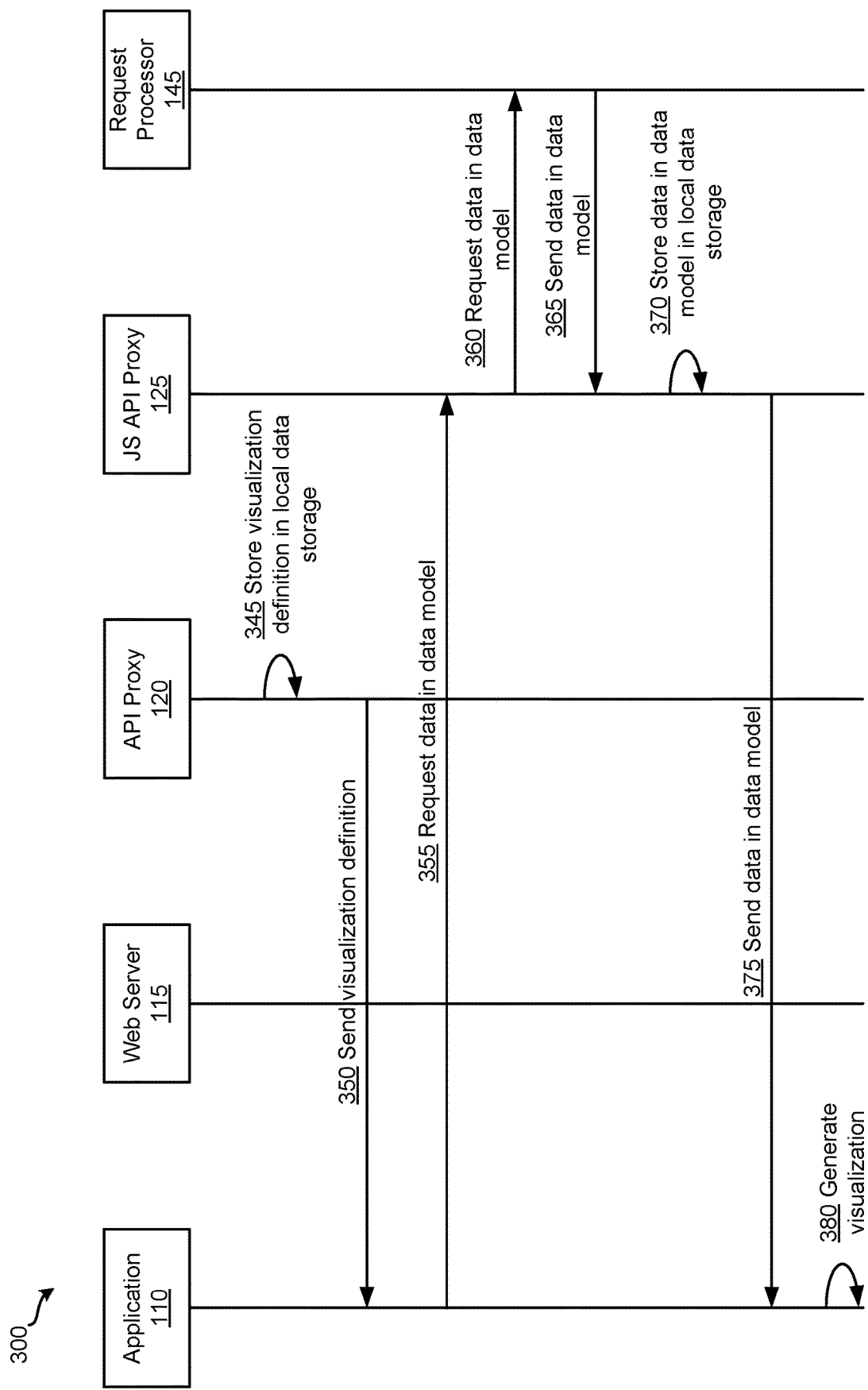

An example operation of system 100 will now be described by reference to FIGS. 3A and 3B. FIGS. 3A and 3B illustrate an example data flow 300 through system 100 according to some embodiments. In this example operation, a user of application 110 has requested to view a visualization of data in a data model. Referring to FIG. 3A, the example operation of system 100 starts with application 110 sending, at 305, a request for static data associated with the visualization of data to web server 115. In response to the request, web server 115 determines whether it can communicate with computing system 140. For this example, web server 115 determines that it can communicate with computing system 140. Thus, web server 115 sends, at 310, the request to request processor 145. When request processor 145 receives the request, request processor 145 accesses data storage 150, retrieves the requested data, and sends, at 315, it back to web server 115. Once web server 115 receives the requested static data, web server 115 stores, at 320, it in local data storage 130. Next, web server 115 sends, at 325, the static data to application 110.

Application 110 then sends, at 330, a request for a visualization definition of the definition to API proxy 120. In response to the request, API proxy 120 determines whether it can communicate with computing system 140. In this example, API proxy 120 determines that it can communicate with computing system 140. As such, API proxy 120 sends, at 335, the request to request processor 145. Upon receiving the request, request processor 145 accesses data storage 150, retrieves the requested visualization definition, and sends, at 340, it back to API proxy 120. Referring to FIG. 3B, when API proxy 120 receives the visualization definition, API proxy 120 stores, at 345, it in local data storage 130. Then, API proxy 120 sends, at 350, the visualization definition to application 110.

As explained above, a visualization definition may include a title associated with the visualization, units of the values of data in the visualization, a chart type (e.g., a pie chart, a bar chart, a scatter chart, a line chart, etc.) associated with the visualization, colors of elements in the visualization, dimension values of dimensions associated with the visualization, a set of queries for data in a data model that is used for the visualization, etc., in some embodiments.

Next, application 110 sends, at 355, JS API proxy 125 the set of queries included in the visualization definition in order to request for data in a data model (e.g., data stored according to the data model) that is used for the visualization. In response to receiving the set of queries, JS API proxy 125 determines whether it can communicate with computing system 140. For this example, JS API proxy 125 determines that it can communicate with computing system 140. Thus, JS API proxy 125 sends, at 360, the set of queries to request processor 145. When request processor 145 receives the set of queries, request processor 145 queries data storage 150 according to the set of queries, retrieves the requested data, and sends, at 365, it back to JS API proxy 125. Upon receiving the requested data, JS API proxy 125 stores, at 370, it in local data storage 130. JS API proxy 125 then sends, at 375, the data to application 110. Finally, application 110 generates, at 380, the visualization based on the static data, the visualization definition, and the data in the data model. Application 110 may present (e.g., by displaying on a display of client device 105) the visualization to the user of application 110.

Figure 4A:
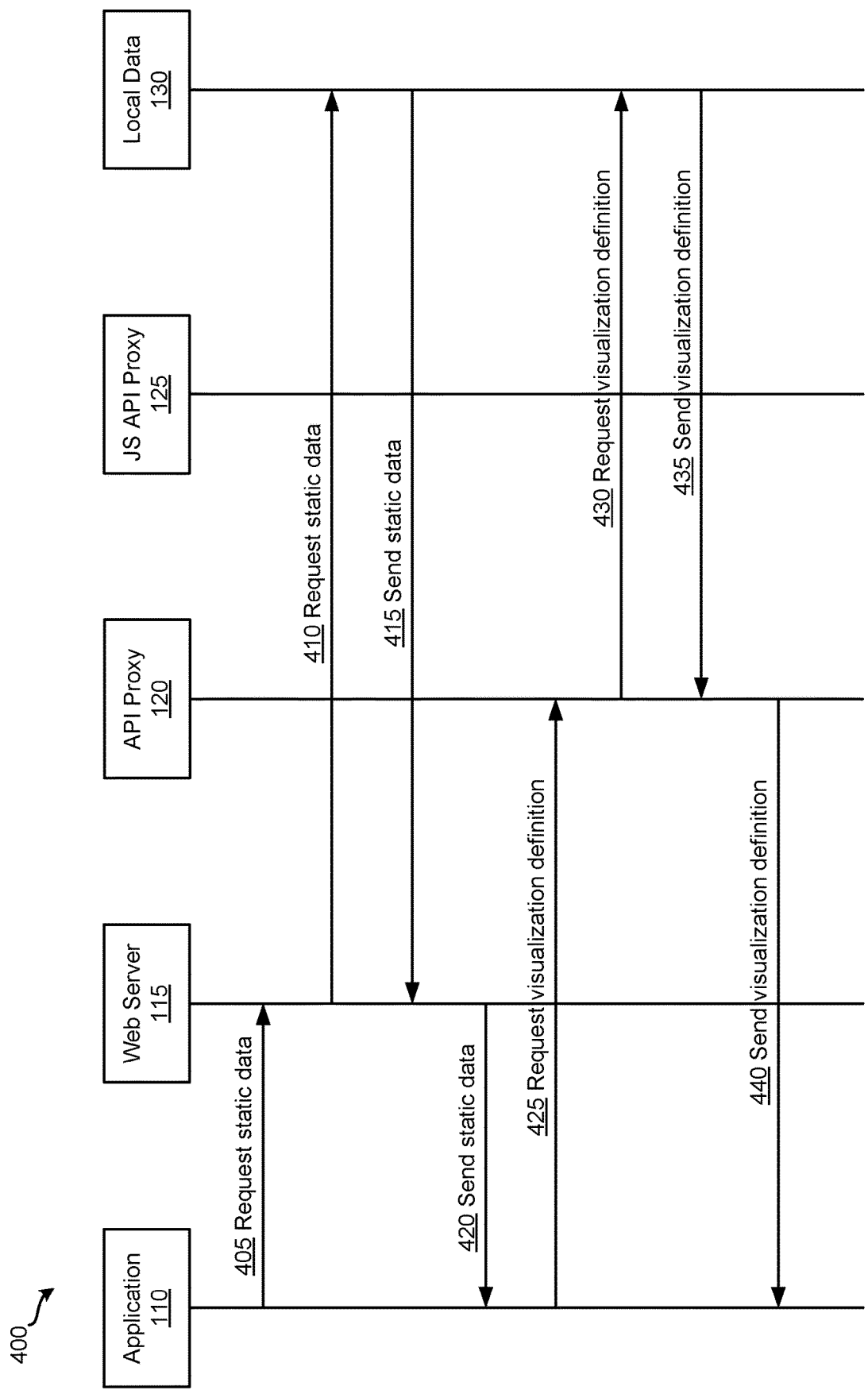
FIGS. 4A and 4B illustrate another example data flow through the system illustrated in FIG. 1 according to some embodiments.
Figure 4B:
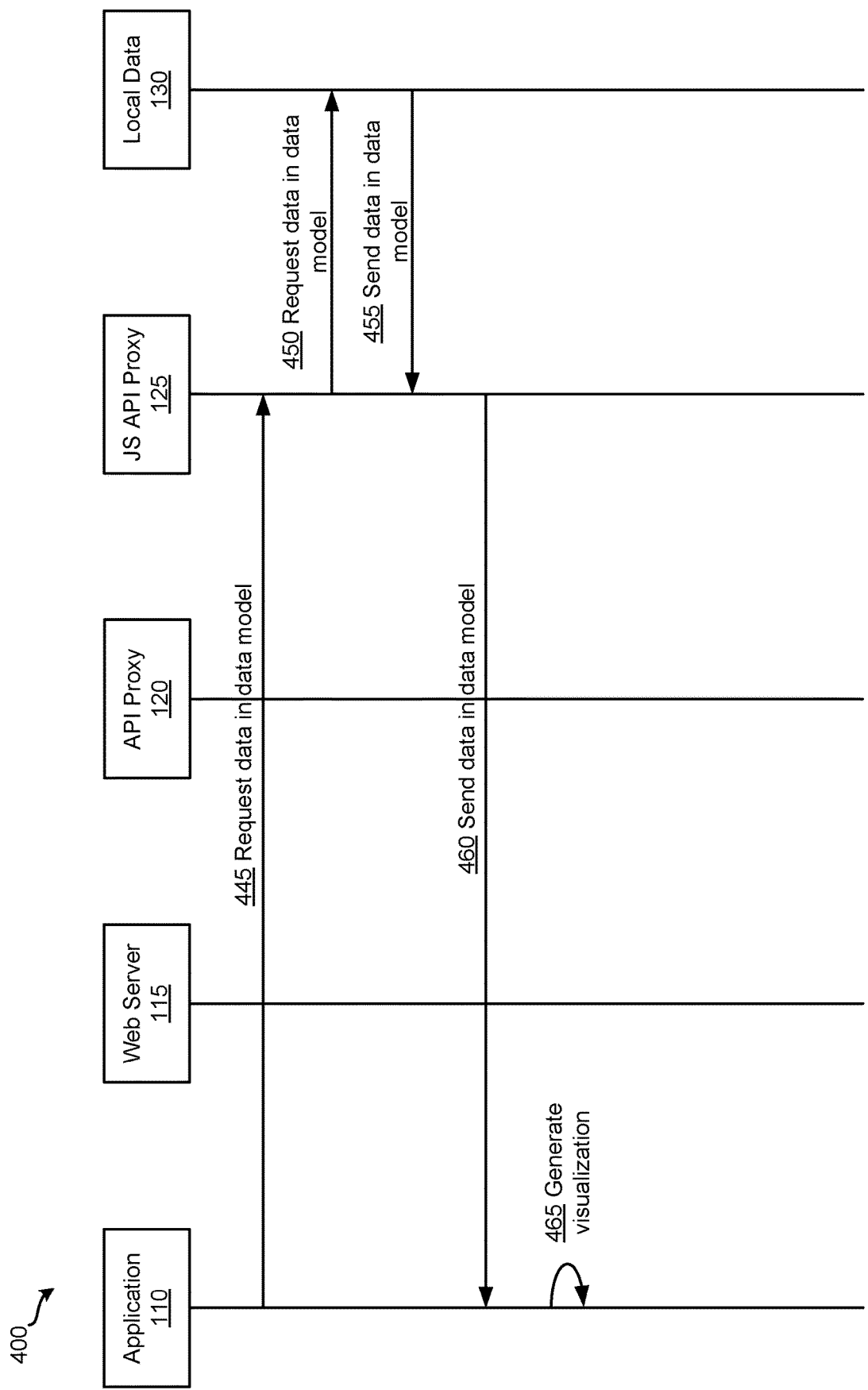

The example operation described above illustrates a data flow in which client device is operating in an online mode (e.g., client device 105 can communicate with computing system 140). Another example operation of system 100 in which client device 105 is operating in an offline mode (e.g., client device 105 cannot communicate with computing system 140) will now be described by reference to FIGS. 4A and 4B. FIGS. 4A and 4B illustrate another example data flow 400 through system 100 according to some embodiments. For this example operation, a user of application 110 has requested to view the same visualization presented at the end of data flow 300. Specifically, the user of application 110 requested to view the visualization at some time after requesting to view the visualization and being presented with the visualization in data flow 300.

Referring to FIG. 4A, the example operation of system 100 begins with application 110 sending, at 405, a request for static data associated with the visualization of data to web server 115. In response to the request, web server 115 determines whether it can communicate with computing system 140. In this example, web server 115 determines that it cannot communicate with computing system 140. As such, web server 115 sends, at 410, the request to local data storage 130. For this example, local data storage 130 is storing the requested static data. Thus, local data storage 130 sends, at 415, the data to web server 115. When web server 115 receives the requested static data, web server 115 sends, at 420, the static data to application 110.

Application 110 then sends, at 425, a request for a visualization definition of the visualization to API proxy 120. In response to the request, API proxy 120 determines whether it can communicate with computing system 140. For this example, API proxy 120 determines that it cannot communicate with computing system 140. So API proxy 120 sends, at 430, the request to local data storage 130. In this example, local data storage 130 is storing the requested visualization definition. As such, local data storage 130 sends, at 435, the visualization definition to API proxy 120. Next, API proxy 120 sends, at 440, the visualization definition to application 110.

As described above, in some embodiments, a visualization definition includes a title associated with the visualization, units of the values of data in the visualization, a chart type (e.g., a pie chart, a bar chart, a scatter chart, a line chart, etc.) associated with the visualization, colors of elements in the visualization, dimension values of dimensions associated with the visualization, a set of queries for data in a data model that is used for the visualization, etc. Referring to FIG. 4B, application 110 then sends, at 445, JS API proxy 125 the set of queries included in the visualization definition. In response to the receiving the set of queries, JS API proxy 125 determines whether it can communicate with computing system 140. In this example, JS API proxy 125 determines that it cannot communicate with computing system 140. Hence, JS API proxy 125 queries, at 450, local data storage 130 according to the set of queries. For this example, local data storage 130 is storing the requested data. Thus, local data storage 130 sends, at 455, the data to JS API proxy 125. Next, JS API proxy 125 sends, at 460, the data to application 110. Finally, application 110 generates, at 465, the visualization based on the static data, the visualization definition, and the data in the data model. In addition, Application 110 can present (e.g., by displaying on a display of client device 105) the visualization to the user of application 110.

Figure 5:
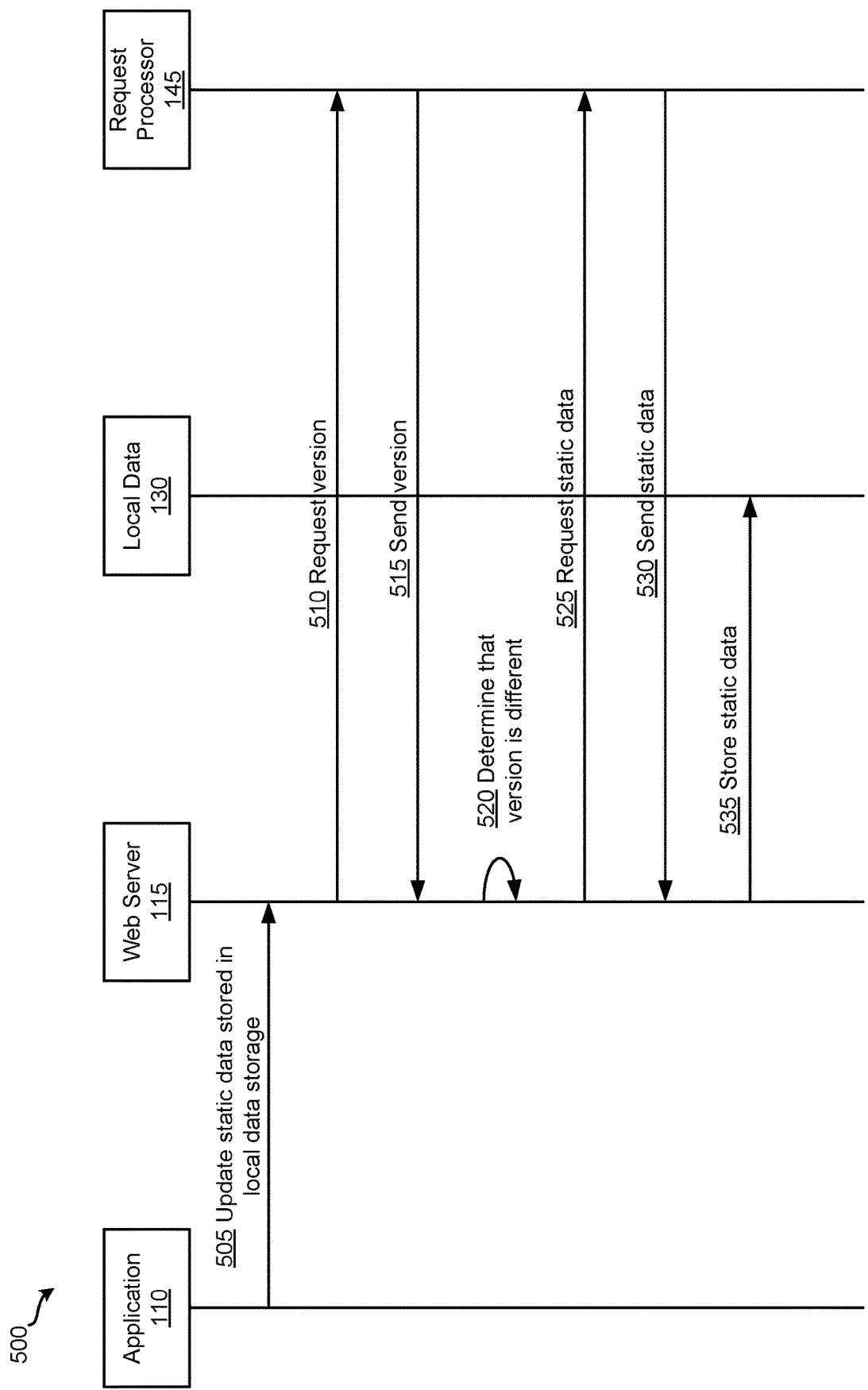
FIG. 5 illustrates another example data flow through the system illustrated in FIG. 1 according to some embodiments.

The example operation described above illustrates a data flow in which client device 105 is operating in an offline mode. Another example operation of system 100 in which client device 105 performs operations when transitioning from operating in an offline mode to operating in an online mode will now be described by reference to FIG. 5. FIG. 5 illustrates another example data flow 500 through system 100 according to some embodiments. For this example operation, client device 105 was operating in an offline mode and determined that it can communicate with computing system 140. Referring to FIG. 5, the example operation of system 100 begins with application 110 sending, at 505, a request to update static data stored in local data storage 130 to web server 115. In response to the request, web server 115 sends, at 510, a request for version information of the static data stored in data storage 150 to request processor 145.

Once request processor 145 receives the request, request processor 145 retrieves the requested version information and sends, at 515, it to web server 115. Next, web server 115 determines, at 520, that the version information of the data stored in local data storage 130 and the version information of the static data stored in data storage 150 are different. In response, web server 115 sends, at 525, a request for static data to request processor 145. In particular, the request is for the latest version of the static data stored in local storage 130. In response, request processor 145 retrieves the requested static data from data storage 150 and sends, at 530, it back to web server 115. Finally, web server 115 stores, at 535, the retrieved static data to local data storage 130 by updating the static data stored in local data storage 130 with the retrieved static data.

Figure 6:
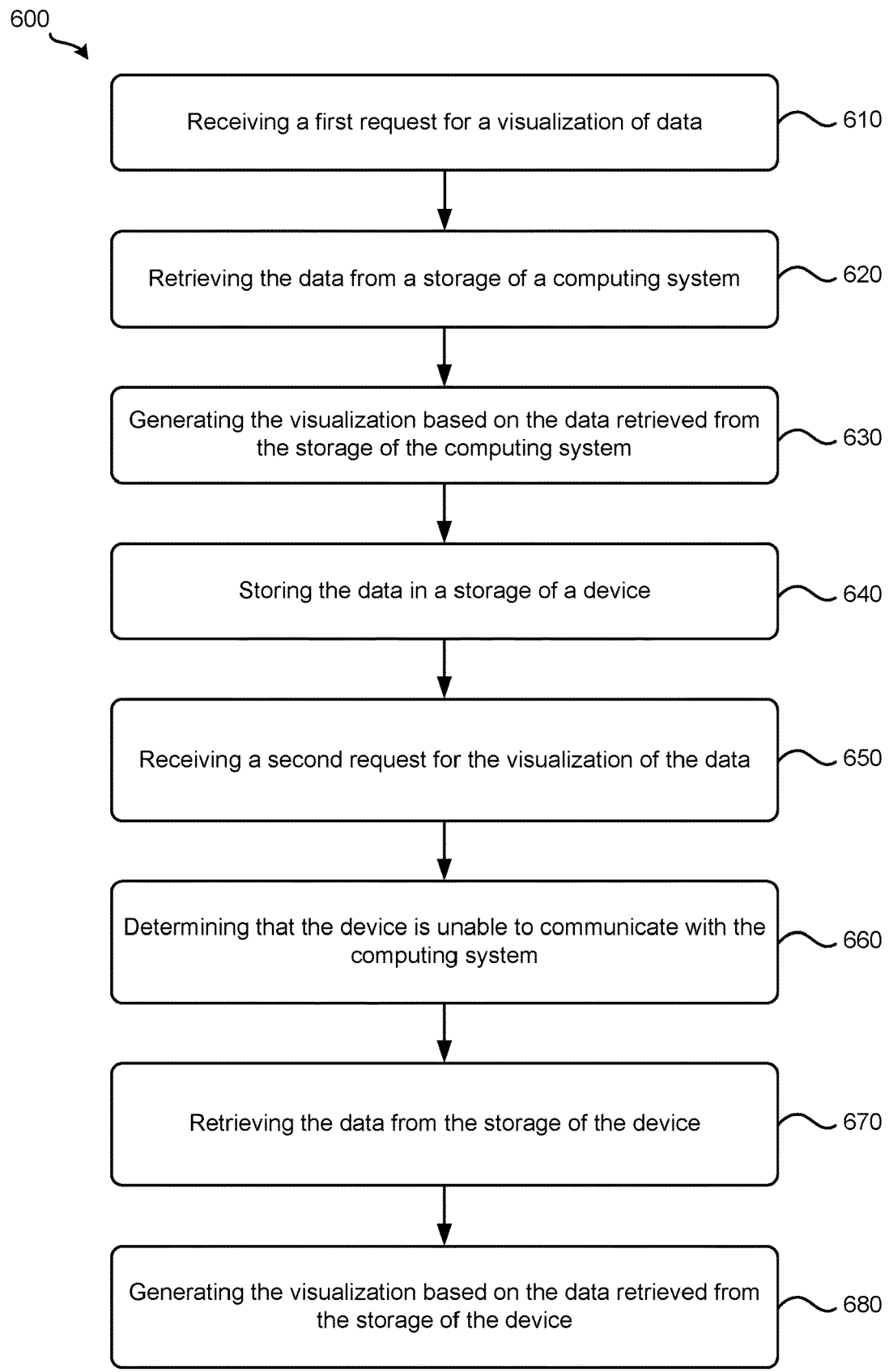
FIG. 6 illustrates a process for operating in an offline mode according to some embodiments.

FIG. 6 illustrates a process 600 for operating in an offline mode according to some embodiments. In some embodiments, client device 105 performs process 600. Process 600 begins by receiving, at 610, a first request for a visualization of data. Referring to FIG. 1 as an example, application 110 can receive the first request for the visualization of data from a user of client device 105.

Next, process 600 retrieves, at 620, the data from a storage of a computing system. Referring to FIG. 1 as an example, client device 105 determines that it can communicate with computing system 140. Thus, client device 105 retrieves the data from data storage 150 of computing system 140. Process 600 then generates, at 630, the visualization based on the data retrieved from the storage of the computing system. Referring to FIG. 1 as an example, application 110 may generate the visualization based on data retrieved from data storage 150 of computing system 140 and present it to the user of client device 105. Next, process 600 stores, at 640, the data in a storage of a device. Referring to FIG. 1 as an example, client device 105 can store the data retrieved from data storage 150 of computing system 140 in local data storage 130.

At 650, process 600 receives a second request for the visualization of the data. Referring to FIG. 1 as an example, application 110 can receive the second request for the visualization of the data from a user of client device 105. Next, process 600 determines, at 660, that the device is unable to communicate with the computing system. Referring to FIG. 1 as an example, client device 105 may determine that it cannot communicate with computing system 140. Process 600 then retrieves, at 670, the data from the storage of the device. Referring to FIG. 1 as an example, after client device 105 determines that it cannot communicate with computing system 140, client device 105 determines that local data storage 130 is storing the data for the visualization. Thus, client device 105 retrieves the data from local data storage 130. Finally, process 600 generates, at 680, the visualization based on the data retrieved from the storage of the device. Referring to FIG. 1 as an example, application 110 may generate the visualization based on the data retrieved from local data storage 130 and present it to the user of client device 105.

Figure 7:
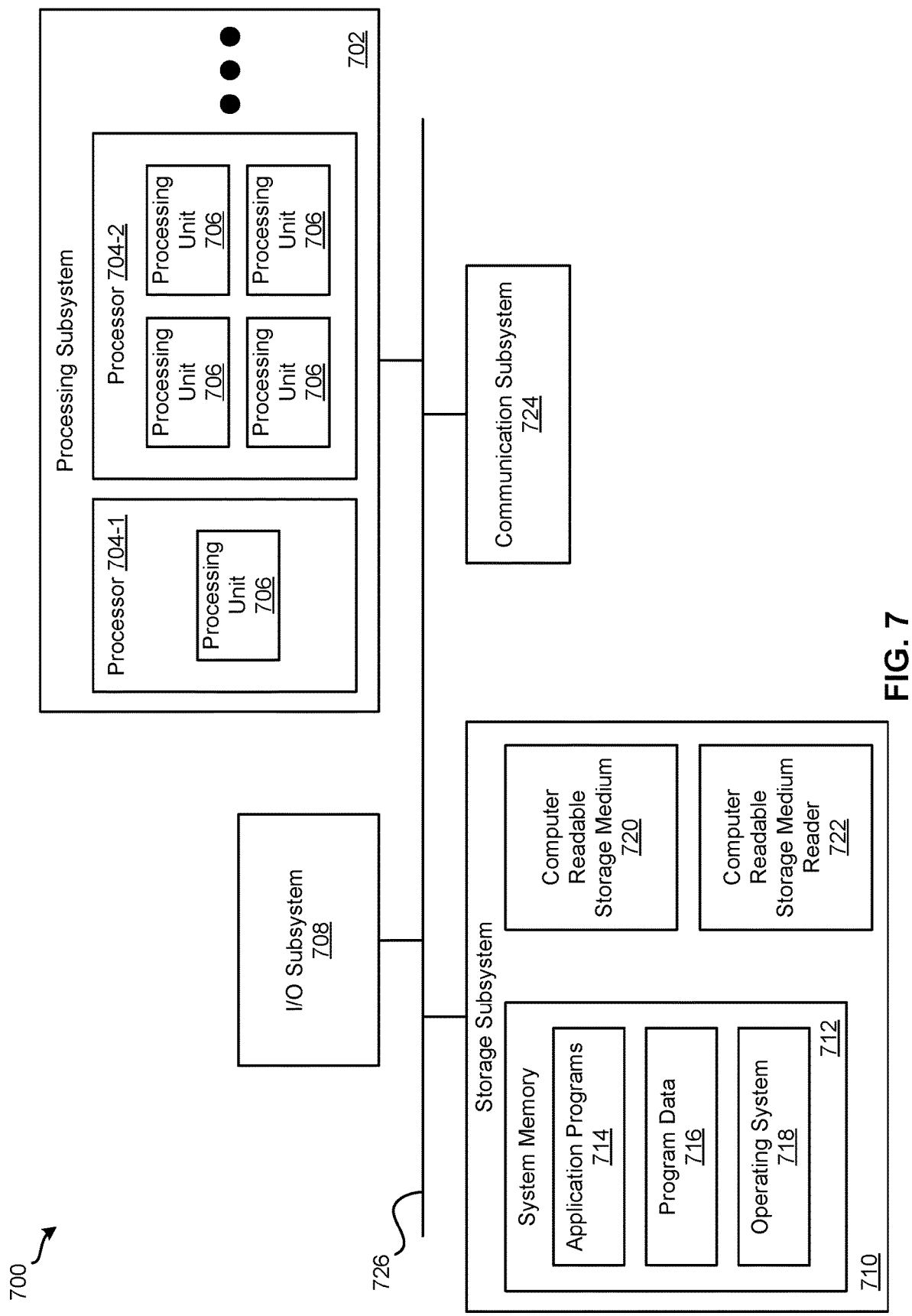
FIG. 7 illustrates an exemplary computer system, in which various embodiments may be implemented.

FIG. 7 illustrates an exemplary computer system 700 for implementing various embodiments described above. For example, computer system 700 may be used to implement client device 105 and computing system 140. Computer system 700 may be a desktop computer, a laptop, a server computer, or any other type of computer system or combination thereof. Some or all elements of application 110, web server 115, API proxy 120, JS API proxy 125, request processor 145, or combinations thereof can be included or implemented in computer system 700. In addition, computer system 700 can implement many of the operations, methods, and/or processes described above (e.g., process 600). As shown in FIG. 7, computer system 700 includes processing subsystem 702, which communicates, via bus subsystem 726, with input/output (I/O) subsystem 708, storage subsystem 710 and communication subsystem 724.

Bus subsystem 726 is configured to facilitate communication among the various components and subsystems of computer system 700. While bus subsystem 726 is illustrated in FIG. 7 as a single bus, one of ordinary skill in the art will understand that bus subsystem 726 may be implemented as multiple buses. Bus subsystem 726 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnect (PCI) bus, a Universal Serial Bus (USB), etc.

Processing subsystem 702, which can be implemented as one or more integrated circuits (e.g., a conventional microprocessor or microcontroller), controls the operation of computer system 700. Processing subsystem 702 may include one or more processors 704. Each processor 704 may include one processing unit 706 (e.g., a single core processor such as processor 704-1) or several processing units 706 (e.g., a multicore processor such as processor 704-2). In some embodiments, processors 704 of processing subsystem 702 may be implemented as independent processors while, in other embodiments, processors 704 of processing subsystem 702 may be implemented as multiple processors integrate into a single chip or multiple chips.

Still, in some embodiments, processors 704 of processing subsystem 702 may be implemented as a combination of independent processors and multiple processors integrated into a single chip or multiple chips.

In some embodiments, processing subsystem 702 can execute a variety of programs or processes in response to program code and can maintain multiple concurrently executing programs or processes. At any given time, some or all of the program code to be executed can reside in processing subsystem 702 and/or in storage subsystem 710. Through suitable programming, processing subsystem 702 can provide various functionalities, such as the functionalities described above by reference to process 600, etc.

I/O subsystem 708 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 700 to a user or another device (e.g., a printer).

As illustrated in FIG. 7, storage subsystem 710 includes system memory 712, computer-readable storage medium 720, and computer-readable storage medium reader 722. System memory 712 may be configured to store software in the form of program instructions that are loadable and executable by processing subsystem 702 as well as data generated during the execution of program instructions. In some embodiments, system memory 712 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 712 may include different types of memory, such as static random access memory (SRAM) and/or dynamic random access memory (DRAM). System memory 712 may include a basic input/output system (BIOS), in some embodiments, that is configured to store basic routines to facilitate transferring information between elements within computer system 700 (e.g., during start-up). Such a BIOS may be stored in ROM (e.g., a ROM chip), flash memory, or any other type of memory that may be configured to store the BIOS.

As shown in FIG. 7, system memory 712 includes application programs 714 (e.g., application 110), program data 716, and operating system (OS) 718. OS 718 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Computer-readable storage medium 720 may be a non-transitory computer-readable medium configured to store software (e.g., programs, code modules, data constructs, instructions, etc.). Many of the components (e.g., application 110, web server 115, API proxy 120, JS API proxy 125, and request processor 145) and/or processes (e.g., process 600) described above may be implemented as software that when executed by a processor or processing unit (e.g., a processor or processing unit of processing subsystem 702) performs the operations of such components and/or processes. Storage subsystem 710 may also store data used for, or generated during, the execution of the software.

Storage subsystem 710 may also include computer-readable storage medium reader 722 that is configured to communicate with computer-readable storage medium 720. Together and, optionally, in combination with system memory 712, computer-readable storage medium 720 may comprehensively represent remote, local, fixed, and/or removable storage devices plus storage media for temporarily and/or more permanently containing, storing, transmitting, and retrieving computer-readable information.

Computer-readable storage medium 720 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSD), flash memory card (e.g., secure digital (SD) cards, CompactFlash cards, etc.), USB flash drives, or any other type of computer-readable storage media or device.

Communication subsystem 724 serves as an interface for receiving data from, and transmitting data to, other devices, computer systems, and networks. For example, communication subsystem 724 may allow computer system 700 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication subsystem 724 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication subsystem 724 may provide components configured for wired communication (e.g., Ethernet) in addition to or instead of components configured for wireless communication.

One of ordinary skill in the art will realize that the architecture shown in FIG. 7 is only an example architecture of computer system 700, and that computer system 700 may have additional or fewer components than shown, or a different configuration of components. The various components shown in FIG. 7 may be implemented in hardware, software, firmware or any combination thereof, including one or more signal processing and/or application specific integrated circuits.

Figure 8:
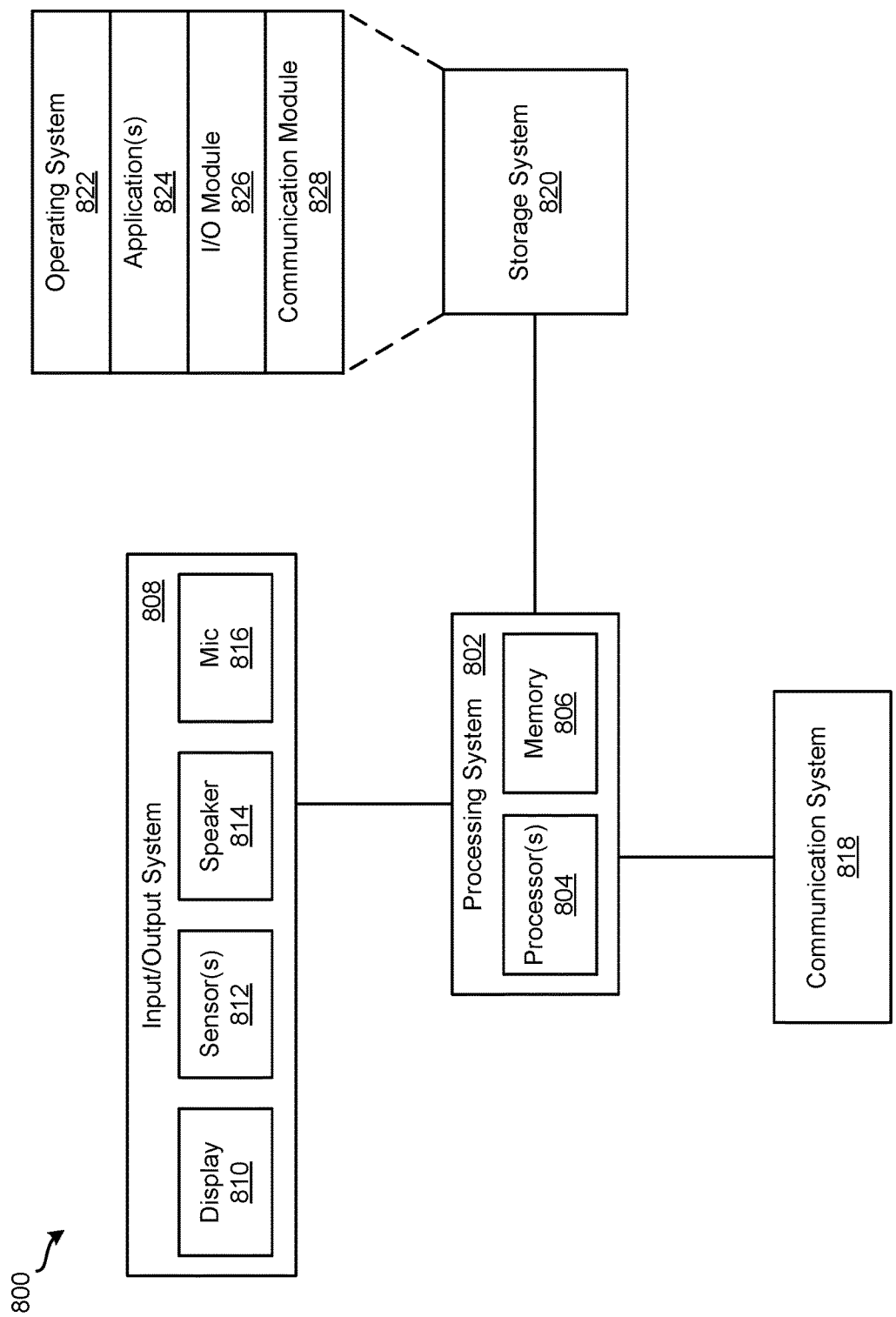
FIG. 8 illustrates an exemplary computing device, in which various embodiments may be implemented.

FIG. 8 illustrates an exemplary computing device 800 for implementing various embodiments described above. For example, computing device 800 may be used to implement client device 105 and computing system 140. Computing device 800 may be a cellphone, a smartphone, a wearable device, an activity tracker or manager, a tablet, a personal digital assistant (PDA), a media player, or any other type of mobile computing device or combination thereof. Some or all elements of application 110, web server 115, API proxy 120, JS API proxy 125, request processor 145, or combinations thereof can be included or implemented in computing device 800. In addition, computing device 800 can implement many of the operations, methods, and/or processes described above (e.g., process 600). As shown in FIG. 8, computing device 800 includes processing system 802, input/output (I/O) system 808, communication system 818, and storage system 820. These components may be coupled by one or more communication buses or signal lines.

Processing system 802, which can be implemented as one or more integrated circuits (e.g., a conventional microprocessor or microcontroller), controls the operation of computing device 800. As shown, processing system 802 includes one or more processors 804 and memory 806. Processors 804 are configured to run or execute various software and/or sets of instructions stored in memory 806 to perform various functions for computing device 800 and to process data.

Each processor of processors 804 may include one processing unit (e.g., a single core processor) or several processing units (e.g., a multicore processor). In some embodiments, processors 804 of processing system 802 may be implemented as independent processors while, in other embodiments, processors 804 of processing system 802 may be implemented as multiple processors integrate into a single chip. Still, in some embodiments, processors 804 of processing system 802 may be implemented as a combination of independent processors and multiple processors integrated into a single chip.

Memory 806 may be configured to receive and store software (e.g., operating system 822, applications 824, I/O module 826, communication module 828, etc. from storage system 820) in the form of program instructions that are loadable and executable by processors 804 as well as data generated during the execution of program instructions. In some embodiments, memory 806 may include volatile memory (e.g., random access memory (RAM)), non-volatile memory (e.g., read-only memory (ROM), programmable read-only memory (PROM), erasable programmable read-only memory (EPROM), electrically erasable programmable read-only memory (EEPROM), flash memory, etc.), or a combination thereof.

I/O system 808 is responsible for receiving input through various components and providing output through various components. As shown for this example, I/O system 808 includes display 810, one or more sensors 812, speaker 814, and microphone 816. Display 810 is configured to output visual information (e.g., a graphical user interface (GUI) generated and/or rendered by processors 804). In some embodiments, display 810 is a touch screen that is configured to also receive touch-based input. Display 810 may be implemented using liquid crystal display (LCD) technology, light-emitting diode (LED) technology, organic LED (OLED) technology, organic electro luminescence (OEL) technology, or any other type of display technologies. Sensors 812 may include any number of different types of sensors for measuring a physical quantity (e.g., temperature, force, pressure, acceleration, orientation, light, radiation, etc.). Speaker 814 is configured to output audio information and microphone 816 is configured to receive audio input. One of ordinary skill in the art will appreciate that I/O system 808 may include any number of additional, fewer, and/or different components. For instance, I/O system 808 may include a keypad or keyboard for receiving input, a port for transmitting data, receiving data and/or power, and/or communicating with another device or component, an image capture component for capturing photos and/or videos, etc.

Communication system 818 serves as an interface for receiving data from, and transmitting data to, other devices, computer systems, and networks. For example, communication system 818 may allow computing device 800 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication system 818 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication system 818 may provide components configured for wired communication (e.g., Ethernet) in addition to or instead of components configured for wireless communication.

Storage system 820 handles the storage and management of data for computing device 800. Storage system 820 may be implemented by one or more non-transitory machine-readable mediums that are configured to store software (e.g., programs, code modules, data constructs, instructions, etc.) and store data used for, or generated during, the execution of the software. Many of the components (e.g., application 110, web server 115, API proxy 120, JS API proxy 125, and request processor 145) and/or processes (e.g., process 600) described above may be implemented as software that when executed by a processor or processing unit (e.g., processors 804 of processing system 802) performs the operations of such components and/or processes.

In this example, storage system 820 includes operating system 822, one or more applications 824, I/O module 826, and communication module 828. Operating system 822 includes various procedures, sets of instructions, software components and/or drivers for controlling and managing general system tasks (e.g., memory management, storage device control, power management, etc.) and facilitates communication between various hardware and software components. Operating system 822 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Applications 824 can include any number of different applications installed on computing device 800. For example, application 110 may be installed on computing device 800. Other examples of such applications may include a browser application, an address book application, a contact list application, an email application, an instant messaging application, a word processing application, JAVA-enabled applications, an encryption application, a digital rights management application, a voice recognition application, location determination application, a mapping application, a music player application, etc.

I/O module 826 manages information received via input components (e.g., display 810, sensors 812, and microphone 816) and information to be outputted via output components (e.g., display 810 and speaker 814). Communication module 828 facilitates communication with other devices via communication system 818 and includes various software components for handling data received from communication system 818.

One of ordinary skill in the art will realize that the architecture shown in FIG. 8 is only an example architecture of computing device 800, and that computing device 800 may have additional or fewer components than shown, or a different configuration of components. The various components shown in FIG. 8 may be implemented in hardware, software, firmware or any combination thereof, including one or more signal processing and/or application specific integrated circuits.

Figure 9:
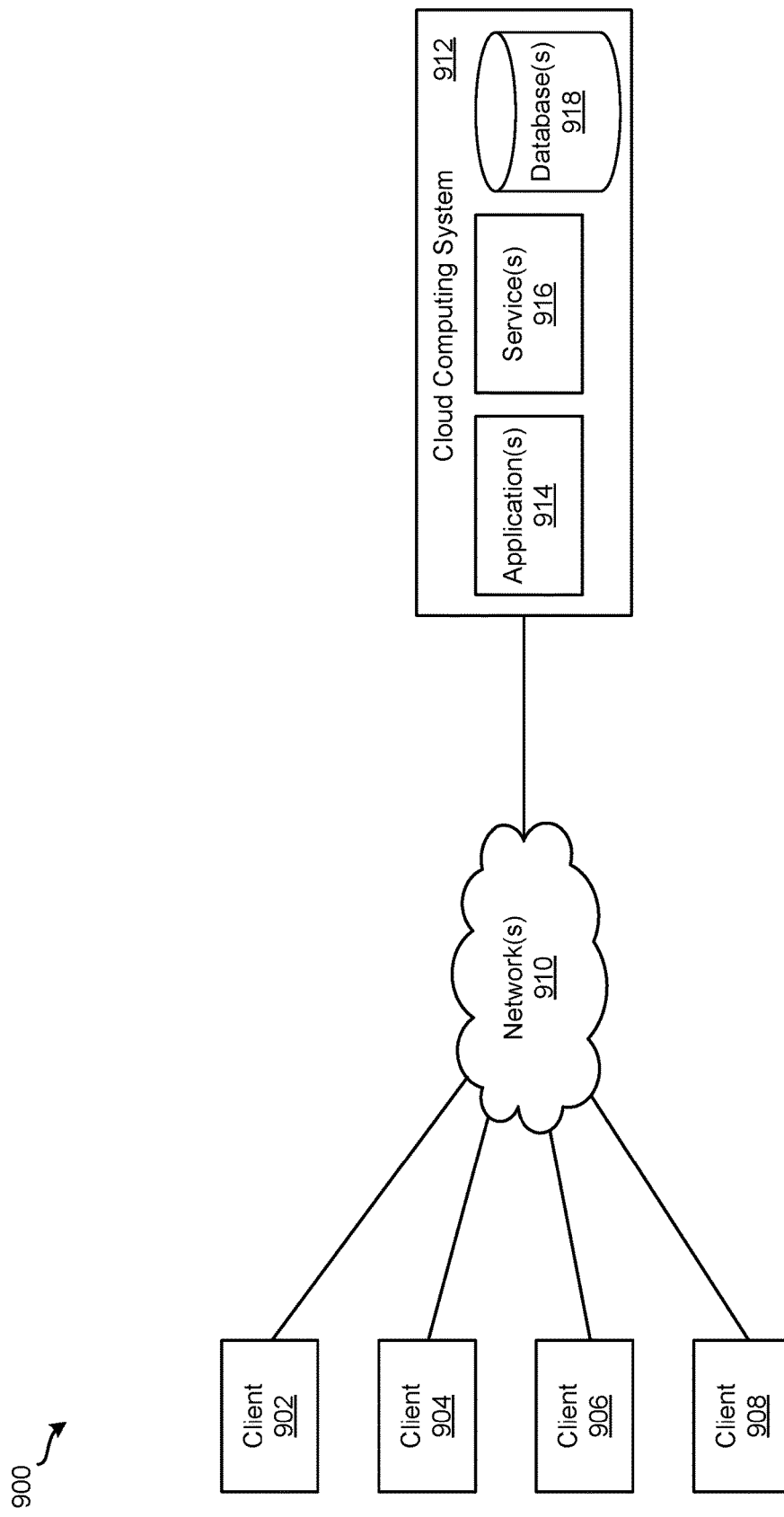
FIG. 9 illustrates system for implementing various embodiments described above.

FIG. 9 illustrates an exemplary system 900 for implementing various embodiments described above. For example, cloud computing system 912 of system 900 may be used to implement computing system 140 and one of client devices 902-908 may be used to implement client device 105. As shown, system 900 includes client devices 902-908, one or more networks 910, and cloud computing system 912. Cloud computing system 912 is configured to provide resources and data to client devices 902-908 via networks 910. In some embodiments, cloud computing system 900 provides resources to any number of different users (e.g., customers, tenants, organizations, etc.). Cloud computing system 912 may be implemented by one or more computer systems (e.g., servers), virtual machines operating on a computer system, or a combination thereof.

As shown, cloud computing system 912 includes one or more applications 914, one or more services 916, and one or more databases 918. Cloud computing system 900 may provide applications 914, services 916, and databases 918 to any number of different customers in a self-service, subscription-based, elastically scalable, reliable, highly available, and secure manner.

In some embodiments, cloud computing system 900 may be adapted to automatically provision, manage, and track a customer's subscriptions to services offered by cloud computing system 900. Cloud computing system 900 may provide cloud services via different deployment models. For example, cloud services may be provided under a public cloud model in which cloud computing system 900 is owned by an organization selling cloud services and the cloud services are made available to the general public or different industry enterprises. As another example, cloud services may be provided under a private cloud model in which cloud computing system 900 is operated solely for a single organization and may provide cloud services for one or more entities within the organization. The cloud services may also be provided under a community cloud model in which cloud computing system 900 and the cloud services provided by cloud computing system 900 are shared by several organizations in a related community. The cloud services may also be provided under a hybrid cloud model, which is a combination of two or more of the aforementioned different models.

In some instances, any one of applications 914, services 916, and databases 918 made available to client devices 902-908 via networks 910 from cloud computing system 900 is referred to as a "cloud service." Typically, servers and systems that make up cloud computing system 900 are different from the on-premises servers and systems of a customer. For example, cloud computing system 900 may host an application and a user of one of client devices 902-908 may order and use the application via networks 910.

Applications 914 may include software applications that are configured to execute on cloud computing system 912 (e.g., a computer system or a virtual machine operating on a computer system) and be accessed, controlled, managed, etc. via client devices 902-908. In some embodiments, applications 914 may include server applications and/or mid-tier applications (e.g., HTTP (hypertext transport protocol) server applications, FTP (file transfer protocol) server applications, CGI (common gateway interface) server applications, JAVA server applications, etc.). Services 916 are software components, modules, application, etc. that are configured to execute on cloud computing system 912 and provide functionalities to client devices 902-908 via networks 910. Services 916 may be web-based services or on-demand cloud services.

Databases 918 are configured to store and/or manage data that is accessed by applications 914, services 916, and/or client devices 902-908. For instance, storage 150 may be stored in databases 918. Databases 918 may reside on a non-transitory storage medium local to (and/or resident in) cloud computing system 912, in a storage-area network (SAN), on a non-transitory storage medium local located remotely from cloud computing system 912. In some embodiments, databases 918 may include relational databases that are managed by a relational database management system (RDBMS). Databases 918 may be a column-oriented databases, row-oriented databases, or a combination thereof. In some embodiments, some or all of databases 918 are in-memory databases. That is, in some such embodiments, data for databases 918 are stored and managed in memory (e.g., random access memory (RAM)).

Client devices 902-908 are configured to execute and operate a client application (e.g., a web browser, a proprietary client application, etc.) that communicates with applications 914, services 916, and/or databases 918 via networks 910. This way, client devices 902-908 may access the various functionalities provided by applications 914, services 916, and databases 918 while applications 914, services 916, and databases 918 are operating (e.g., hosted) on cloud computing system 900. Client devices 902-908 may be computer system 700 or computing device 800, as described above by reference to FIGS. 7 and 8, respectively. Although system 900 is shown with four client devices, any number of client devices may be supported.

Networks 910 may be any type of network configured to facilitate data communications among client devices 902-908 and cloud computing system 912 using any of a variety of network protocols. Networks 910 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A non-transitory machine-readable medium storing a program executable by at least one processing unit of a device, the program comprising sets of instructions for:
   operating an application on the device;
   operating a web server on the device;
   operating an application programming interface (API) proxy on the device;
   operating an javascript (JS) API proxy on the device;
   receiving, by the application, a first request for a visualization of data on a page of the application;
   in response to the first request, sending, by the application, a request for static data associated with the visualization of data to the web server;
   retrieving, by the web server, static data for generating the page from the storage of a computing system;
   storing, by the web server, the static data in a local storage of the device;
   sending, by the web server, the static data to the application;
   sending, by the application, a request for a visualization definition to the API proxy;
   sending, by the API proxy, the request for the visualization definition to the computing system;
   storing, by the API proxy, the visualization definition received from the computing system in the local storage of the device;
   sending, by the API proxy, the visualization definition to the application;
   sending, by the application, a set of queries included in the visualization definition to the JS API proxy to request for data for the visualization;
   sending, by the JS API proxy, the set of queries to the computing system;
   storing, by the JS API proxy, the data for the visualization received from the computing system in the local storage of the device;
   sending, by the JS API proxy, the data for the visualization to the application;
   generating, by the application, the page based on the static data retrieved from the storage of the computing system;
   generating, by the application, the visualization based on the data retrieved from the storage of the computing system;
   receiving, by the application, a second request for the visualization of the data;
   in response to the second request, determining that the device is unable to communicate with the computing system;
   in response to the determining that the device is unable to communicate with the computing system:
      retrieving, by the web server, the static data stored in the local storage of the device;
      retrieving, by the API proxy, the visualization definition stored in the local storage of the device;
      retrieving, by the JS API proxy, the data for the visualization stored in the local storage of the device; and
      generating, by the application, the visualization and the page based on the data for the visualization and the static data retrieved from the local storage of the device; and
   in response to a determination that the device is able to communicate with the computing system:
      retrieving version information of the static data in the storage of the computing system from the computing system;
      in response to a determination that version information of the static data stored in the local storage of the device is different from the version information of the static data retrieved from the storage of the computing system, retrieving a latest version of the static data from the computing device; and
      storing the latest version of the static data retrieved from the computing system in the local storage of the device.

2. The non-transitory machine-readable medium of claim 1, wherein the data for the visualization retrieved from the local storage of the computing system comprises data from a data model.

3. The non-transitory machine-readable medium of claim 1, wherein the visualization definition indicates one or more of a title of the visualization, units of values of the visualization, a chart type, colors of elements in the visualization, dimension values of dimensions associated with the visualization, and a set of queries for data in a data model.

4. The non-transitory machine-readable medium of claim 1, wherein the static data includes one or more of hypertext markup language, cascading style sheets, images, and geographic maps.

5. The non-transitory machine-readable medium of claim 1, wherein the application is analytics application, a data management application, a human capital management application, an enterprise management application, a customer relationship management application, or a financial management application.

6. The non-transitory machine-readable medium of claim 1, wherein the program further comprises sets of instructions for:
   displaying, by the application, the visualization.

7. For a device, a method comprising:
   receiving, by an application operating on the device, a first request for a visualization of data on a page of the application;
   in response to the first request, sending, by the application operating on the device, a request for static data associated with the visualization of data to a web server operating on the device;
   retrieving, by the web server operating on the device, static data for generating the page from the storage of a computing system;
   storing, by the web server operating on the device, the static data in a local storage of the device;
   sending, by the web server operating on the device, the static data to the application;
   sending, by the application operating on the device, a request for a visualization definition to an API proxy operating on the device;
   sending, by the API proxy operating on the device, the request for the visualization definition to the computing system;

storing, by the API proxy operating on the device, the visualization definition received from the computing system in the local storage of the device;

sending, by the API proxy operating on the device, the visualization definition to the application;

sending, by the application operating on the device, a set of queries included in the visualization definition to a JS API proxy operating on the device to request for data for the visualization;

sending, by the JS API proxy operating on the device, the set of queries to the computing system;

storing, by the JS API proxy operating on the device, the data for the visualization received from the computing system in the local storage of the device;

sending, by the JS API proxy operating on the device, the data for the visualization to the application;

generating, by the application operating on the device, the page based on the static data retrieved from the storage of the computing system;

generating, by the application operating on the device, the visualization based on the data retrieved from the storage of the computing system;

receiving, by the application operating on the device, a second request for the visualization of the data;

in response to the second request, determining that the device is unable to communicate with the computing system;

in response to the determining that the device is unable to communicate with the computing system:
retrieving, by the web server operating on the device, the static data stored in the local storage of the device;
retrieving, by the API proxy operating on the device, the visualization definition stored in the local storage of the device;
retrieving, by the JS API proxy operating on the device, the data for the visualization stored in the local storage of the device; and
generating, by the application operating on the device, the visualization and the page based on the data for the visualization and the static data retrieved from the local storage of the device; and in response to a determination that the device is able to communicate with the computing system:
retrieving version information of the static data in the storage of the computing system from the computing system;
in response to a determination that version information of the static data stored in the local storage of the device is different from the version information of the static data retrieved from the storage of the computing system, retrieving a latest version of the static data from the computing device; and
storing the latest version of the static data retrieved from the computing system in the local storage of the device.

8. The method of claim 7, wherein the data for the visualization retrieved from the local storage of the computing system comprises data from a data model.

9. The method of claim 7, wherein the visualization definition indicates one or more of a title of the visualization, units of values of the visualization, a chart type, colors of elements in the visualization, dimension values of dimensions associated with the visualization, and a set of queries for data in a data model.

10. The method of claim 7, wherein the static data includes one or more of hypertext markup language, cascading style sheets, images, and geographic maps.

11. The method of claim 7, wherein the application is analytics application, a data management application, a human capital management application, an enterprise management application, a customer relationship management application, or a financial management application.

12. The method of claim 7, further comprising:
displaying, by the application, the visualization.

13. A system comprising:
a local storage;
a set of processing units; and
a non-transitory computer-readable medium storing instructions that when executed by at least one processing unit in the set of processing units cause the at least one processing unit to:
operate an application;
operate a web server;
operate an application programming interface (API) proxy;
operate an javascript (JS) API proxy;
receive, by the application, a first request for a visualization of data on a page of the application;
in response to the first request, send, by the application, a request for static data associated with the visualization of data to the web server;
retrieve, by the web server, static data for generating the page from the storage of a computing system;
store, by the web server, the static data in the local storage of the system;
send, by the web server, the static data to the application;
send, by the application, a request for a visualization definition to the API proxy;
send, by the API proxy, the request for the visualization definition to the computing system;
store, by the API proxy, the visualization definition received from the computing system in the local storage of the system;
send, by the API proxy, the visualization definition to the application;
send, by the application, a set of queries included in the visualization definition to the JS API proxy to request for data for the visualization;
send, by the JS API proxy, the set of queries to the computing system;
store, by the JS API proxy, the data for the visualization received from the computing system in the local storage of the system;
send, by the JS API proxy, the data for the visualization to the application;
generate, by the application, the page based on the static data retrieved from the storage of the computing system;
generate, by the application, the visualization based on the data retrieved from the storage of the computing system;
receive a second request for the visualization of the data;
in response to the second request, determine that the system is unable to communicate with the computing system;
in response to the determining that the system is unable to communicate with the computing system:
retrieve, by the web server, the static data stored in the local storage of the system;
retrieve, by the API proxy, the visualization definition stored in the local storage of the system;
retrieve, by the JS API proxy, the data for the visualization stored in the local storage of the system; and generate, by the application, the visualization and the page based on the data for the visualization and the static data retrieved from the local storage of the system; and in response to a determination that the system is able to communicate with the computing system:

retrieve version information of the static data in the storage of the computing system from the computing system;

in response to a determination that version information of the static data stored in the local storage of the system is different from the version information of the static data retrieved from the storage of the computing system, retrieving a latest version of the static data from the computing device; and storing the latest version of the static data retrieved from the computing system in the local storage of the system.

14. The system of claim 13, wherein the data for the visualization retrieved from the local storage of the computing system comprises data from a data model.

15. The system of claim 13, wherein the visualization definition indicates one or more of a title of the visualization, units of values of the visualization, a chart type, colors of elements in the visualization, dimension values of dimensions associated with the visualization, and a set of queries for data in a data model.

16. The system of claim 13, wherein the static data includes one or more of hypertext markup language, cascading style sheets, images, and geographic maps.

17. The system of claim 13, wherein the application is analytics application, a data management application, a human capital management application, an enterprise management application, a customer relationship management application, or a financial management application.

18. The system of claim 13, wherein the instructions further cause the at least one processing unit to:

display, by the application, the visualization.

* * * * *